(12) United States Patent
Kim et al.

(10) Patent No.: US 12,286,003 B2
(45) Date of Patent: Apr. 29, 2025

(54) BATTERY COOLING ARRANGEMENT IN AN UNDERBODY OF A VEHICLE

(71) Applicant: LG ENERGY SOLUTION, LTD., Seoul (KR)

(72) Inventors: Kyung Mo Kim, Daejeon (KR); Ho June Chi, Daejeon (KR); Jeong Oh Moon, Daejeon (KR); Jung Hoon Lee, Daejeon (KR); Jin Yong Park, Daejeon (KR); Hee Jun Jin, Daejeon (KR); Jhin Ha Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 667 days.

(21) Appl. No.: 17/625,285

(22) PCT Filed: Aug. 7, 2020

(86) PCT No.: PCT/KR2020/010485
§ 371 (c)(1),
(2) Date: Jan. 6, 2022

(87) PCT Pub. No.: WO2021/025525
PCT Pub. Date: Feb. 11, 2021

(65) Prior Publication Data
US 2022/0314772 A1    Oct. 6, 2022

(30) Foreign Application Priority Data
Aug. 7, 2019 (KR) .......... 10-2019-0096006

(51) Int. Cl.
B60K 11/04    (2006.01)
B60K 1/04    (2019.01)
(Continued)

(52) U.S. Cl.
CPC ........... B60K 1/04 (2013.01); B60K 11/06 (2013.01); B62D 25/20 (2013.01);
(Continued)

(58) Field of Classification Search
CPC .......... B60K 1/04; B60K 11/06; B62D 25/20; H01M 10/613; H01M 10/625;
(Continued)

(56) References Cited

U.S. PATENT DOCUMENTS

2012/0018238 A1    1/2012 Mizoguchi et al.
2015/0017563 A1    1/2015 Shirakawa et al.
(Continued)

FOREIGN PATENT DOCUMENTS

CA    3 070 284 A1    1/2019
CN    102448758 A    5/2012
(Continued)

OTHER PUBLICATIONS

Extended European Search Report for European Application No. 20849612.5, dated Jul. 20, 2022.
(Continued)

*Primary Examiner* — Jason D Shanske
*Assistant Examiner* — James J Triggs
(74) *Attorney, Agent, or Firm* — Birch, Stewart, Kolasch & Birch, LLP

(57) ABSTRACT

Discussed is an underbody for a vehicle including a tray member fastened to a lower portion of a vehicle body frame and including a receiving portion having a structure with an open lower surface to accommodate a battery module; and a cover member to cover the open lower surface of the receiving portion, wherein the cover member includes a flow path to circulate a refrigerant fluid.

19 Claims, 10 Drawing Sheets

(51) Int. Cl.
*B60K 11/06* (2006.01)
*B62D 25/20* (2006.01)
*H01M 10/613* (2014.01)
*H01M 10/625* (2014.01)
*H01M 10/6554* (2014.01)
*H01M 10/6556* (2014.01)
*H01M 50/204* (2021.01)
*H01M 50/242* (2021.01)
*H01M 50/249* (2021.01)
*H01M 50/278* (2021.01)
*H01M 50/282* (2021.01)
*H01M 50/289* (2021.01)
*H01M 50/291* (2021.01)

(52) U.S. Cl.
CPC ....... *H01M 10/613* (2015.04); *H01M 10/625* (2015.04); *H01M 10/6554* (2015.04); *H01M 10/6556* (2015.04); *H01M 50/204* (2021.01); *H01M 50/242* (2021.01); *H01M 50/249* (2021.01); *H01M 50/278* (2021.01); *H01M 50/282* (2021.01); *H01M 50/289* (2021.01); *H01M 50/291* (2021.01); *B60K 2001/0438* (2013.01); *H01M 2220/20* (2013.01)

(58) Field of Classification Search
CPC ........... H01M 10/6554; H01M 50/204; H01M 50/249; H01M 50/282; H01M 50/289
See application file for complete search history.

(56) References Cited

U.S. PATENT DOCUMENTS

| | | |
|---|---|---|
| 2017/0077466 A1 | 3/2017 | Choi et al. |
| 2018/0241103 A1 | 8/2018 | Pfeiff |
| 2019/0009661 A1 | 1/2019 | Okamura et al. |
| 2019/0044203 A1 | 2/2019 | Haag et al. |
| 2019/0173139 A1 | 6/2019 | Kellner et al. |
| 2019/0210659 A1 | 7/2019 | Choi |
| 2020/0365955 A1* | 11/2020 | Kim .................. H01M 10/613 |

FOREIGN PATENT DOCUMENTS

| | | |
|---|---|---|
| JP | 2011-116321 A | 6/2011 |
| JP | 2013-84935 A | 5/2013 |
| JP | 2014-157756 A | 8/2014 |
| JP | 2015-216071 A | 12/2015 |
| JP | 2017-174831 A | 9/2017 |
| JP | 2018-198317 A | 12/2018 |
| JP | 2019-91555 A | 6/2019 |
| JP | 2019-91556 A | 6/2019 |
| JP | 6541724 B2 | 7/2019 |
| JP | 6555549 B2 | 8/2019 |
| JP | 6555550 B2 | 8/2019 |
| KR | 10-0568134 B1 | 4/2006 |
| KR | 10-2010-0135039 A | 12/2010 |
| KR | 10-2012-0012648 A | 2/2012 |
| KR | 10-2014-0127834 A | 11/2014 |
| KR | 10-1478701 B1 | 1/2015 |
| KR | 10-1565980 B1 | 11/2015 |
| KR | 10-2017-0033070 A | 3/2017 |
| KR | 10-2019-0029954 A | 3/2019 |
| KR | 10-2019-0084523 A | 7/2019 |
| WO | WO 2013/084935 A1 | 6/2013 |
| WO | WO 2018/218404 A1 | 12/2018 |
| WO | WO 2019/020772 A1 | 1/2019 |

OTHER PUBLICATIONS

Japanese Notice of Allowance dated Aug. 28, 2023 for Application No. 2022-501321 with an English translation.
International Search Report for PCT/KR2020/010485 mailed on Nov. 17, 2020.
Japanese Office Action for Japanese Application No. 2022-501321, dated Jan. 30, 2023, with an English translation.

* cited by examiner

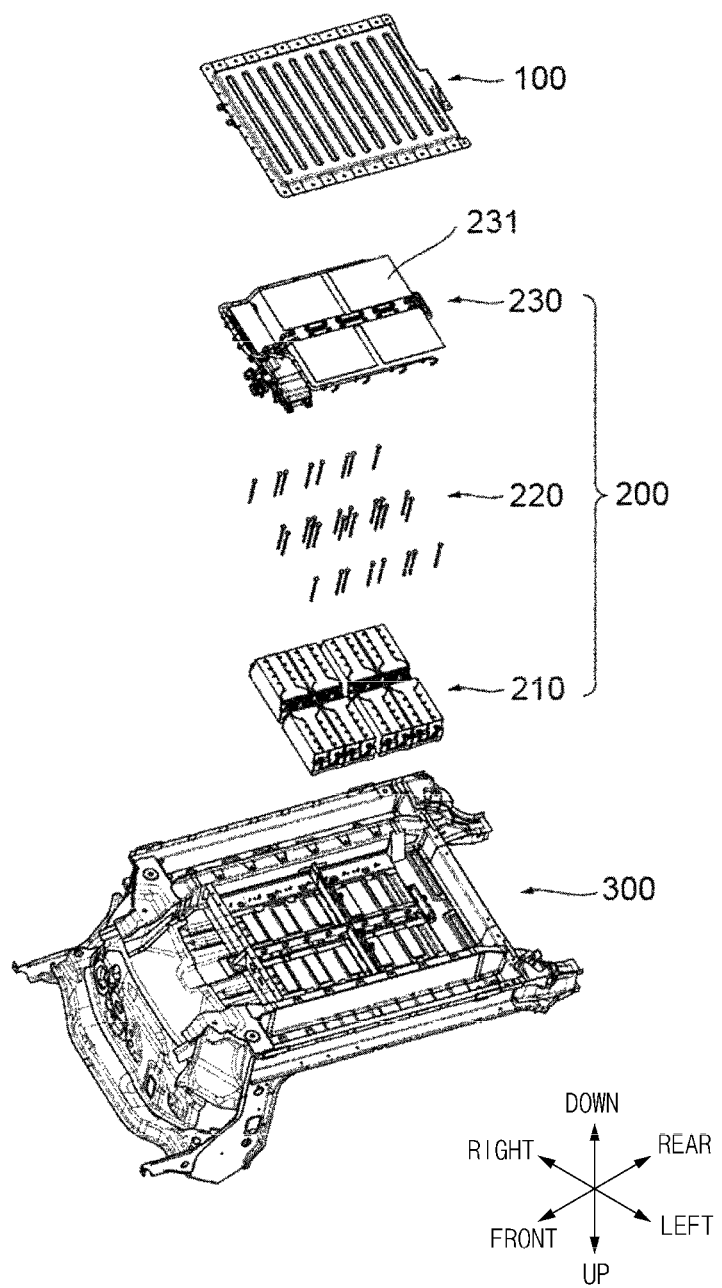
[FIG. 1]

[FIG. 2]
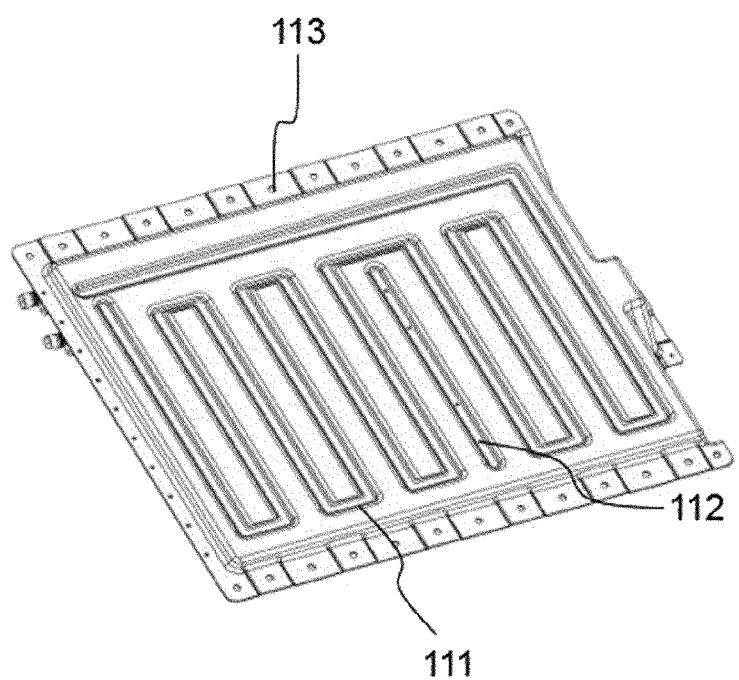

[FIG. 3]
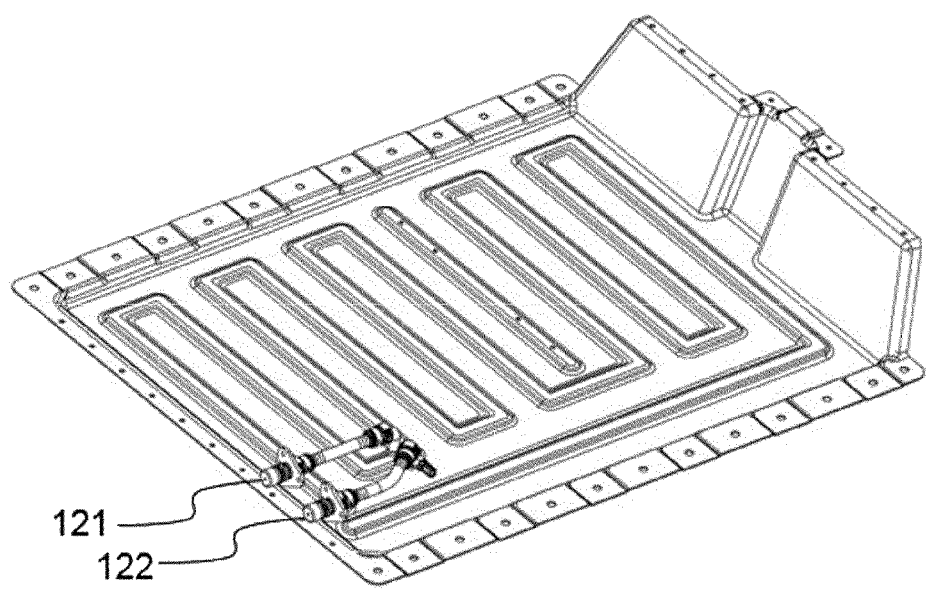

[FIG. 4]
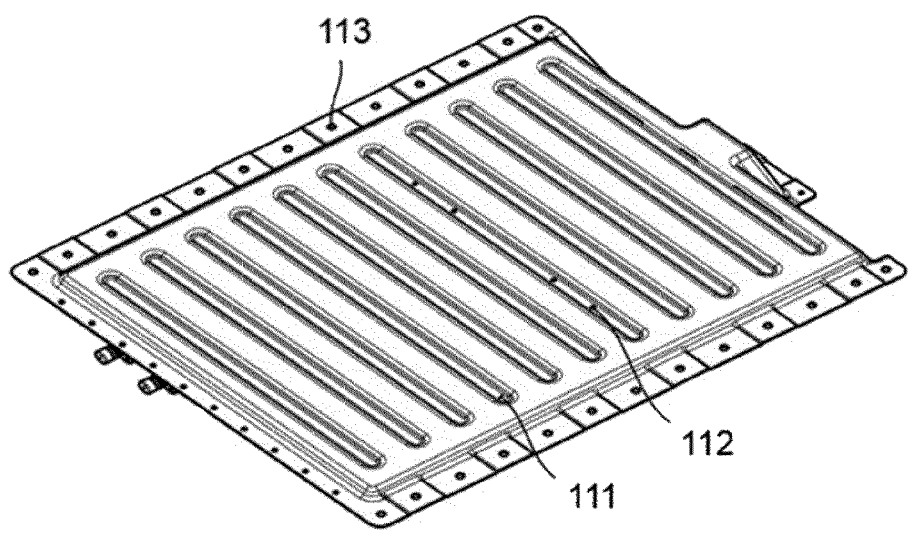

[FIG. 5]
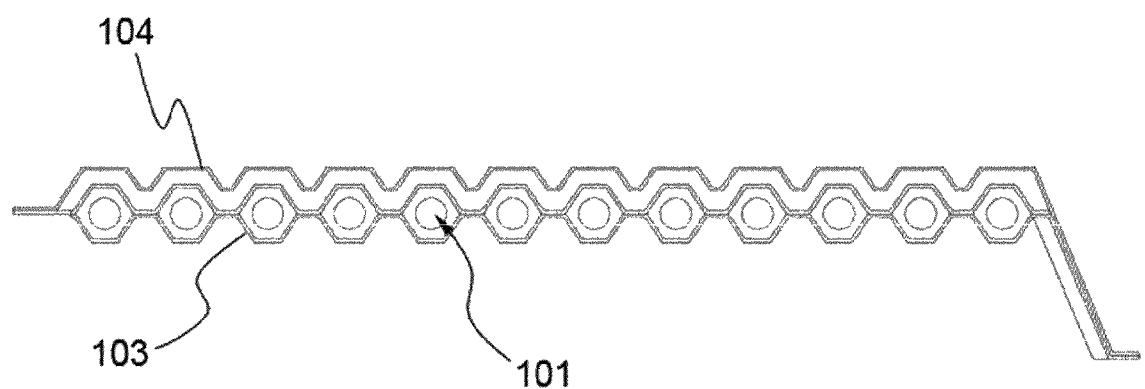

[FIG. 6]
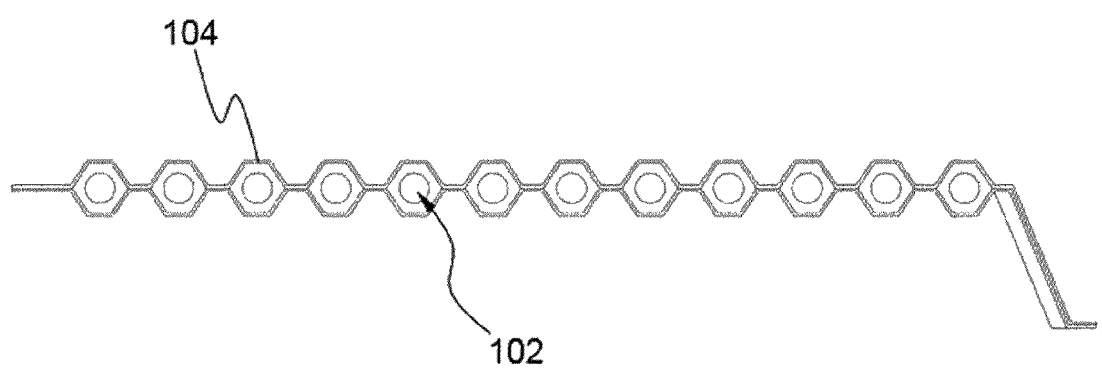

[FIG. 7]
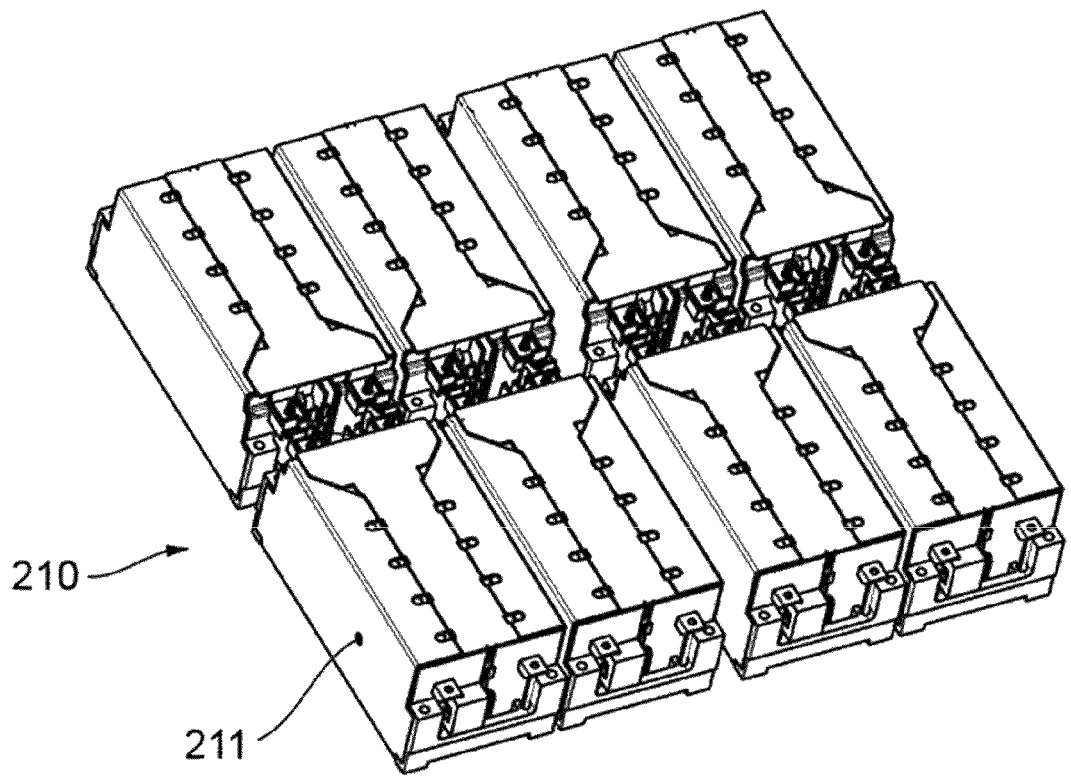

[FIG. 8]
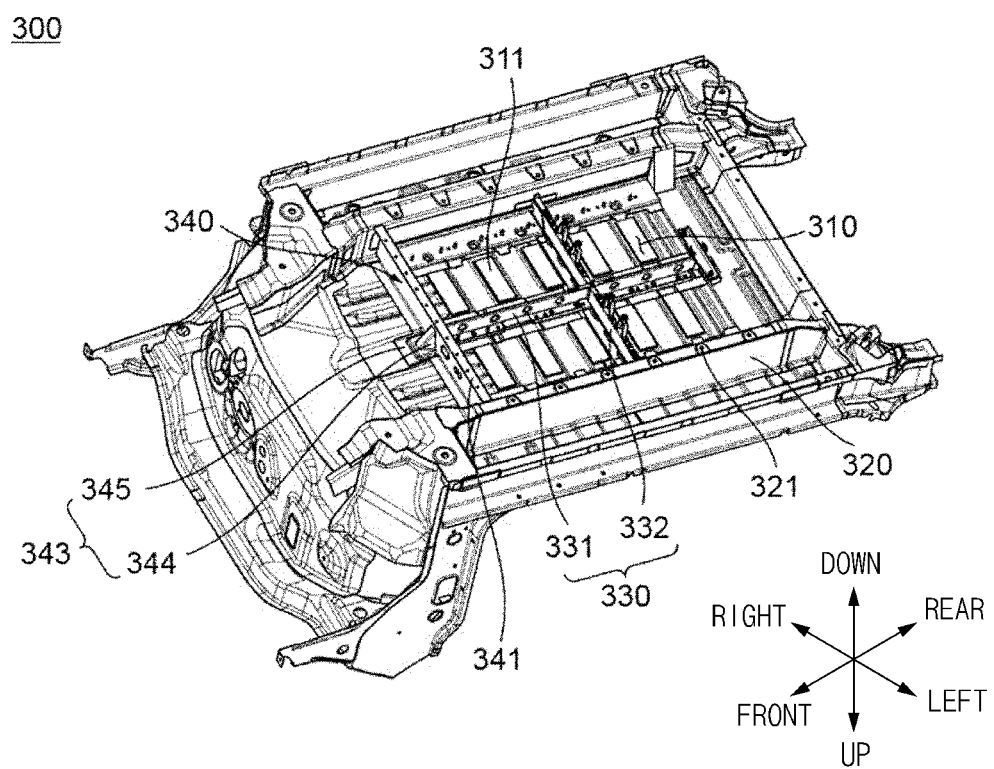

[FIG. 9]
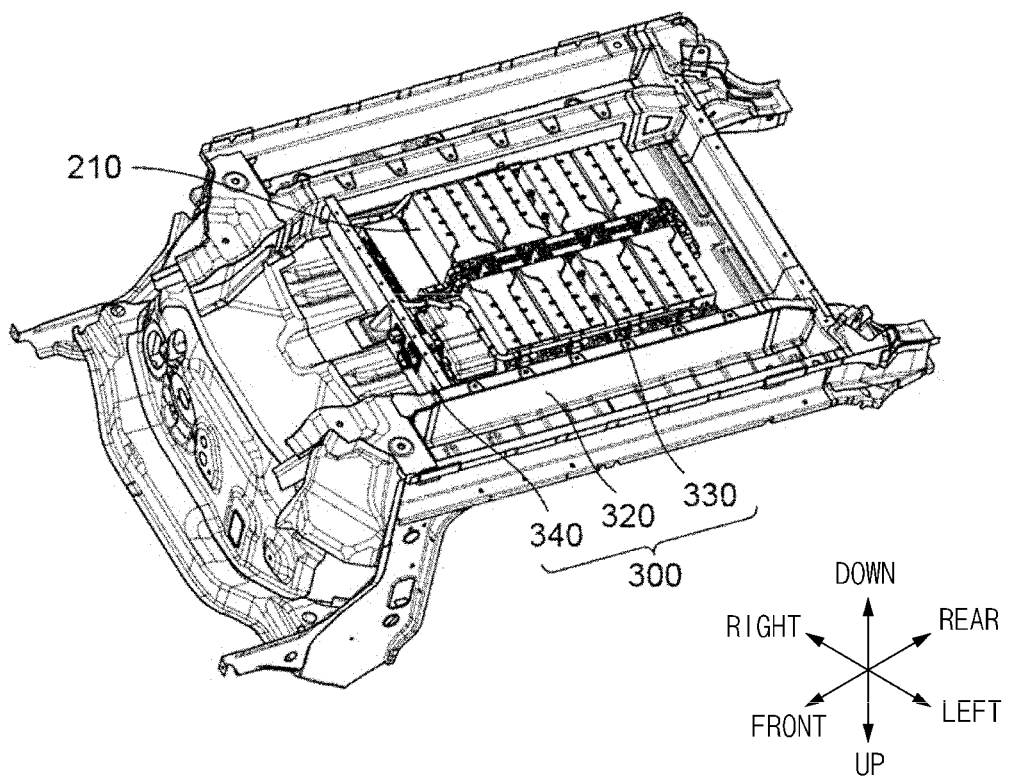

[FIG. 10]
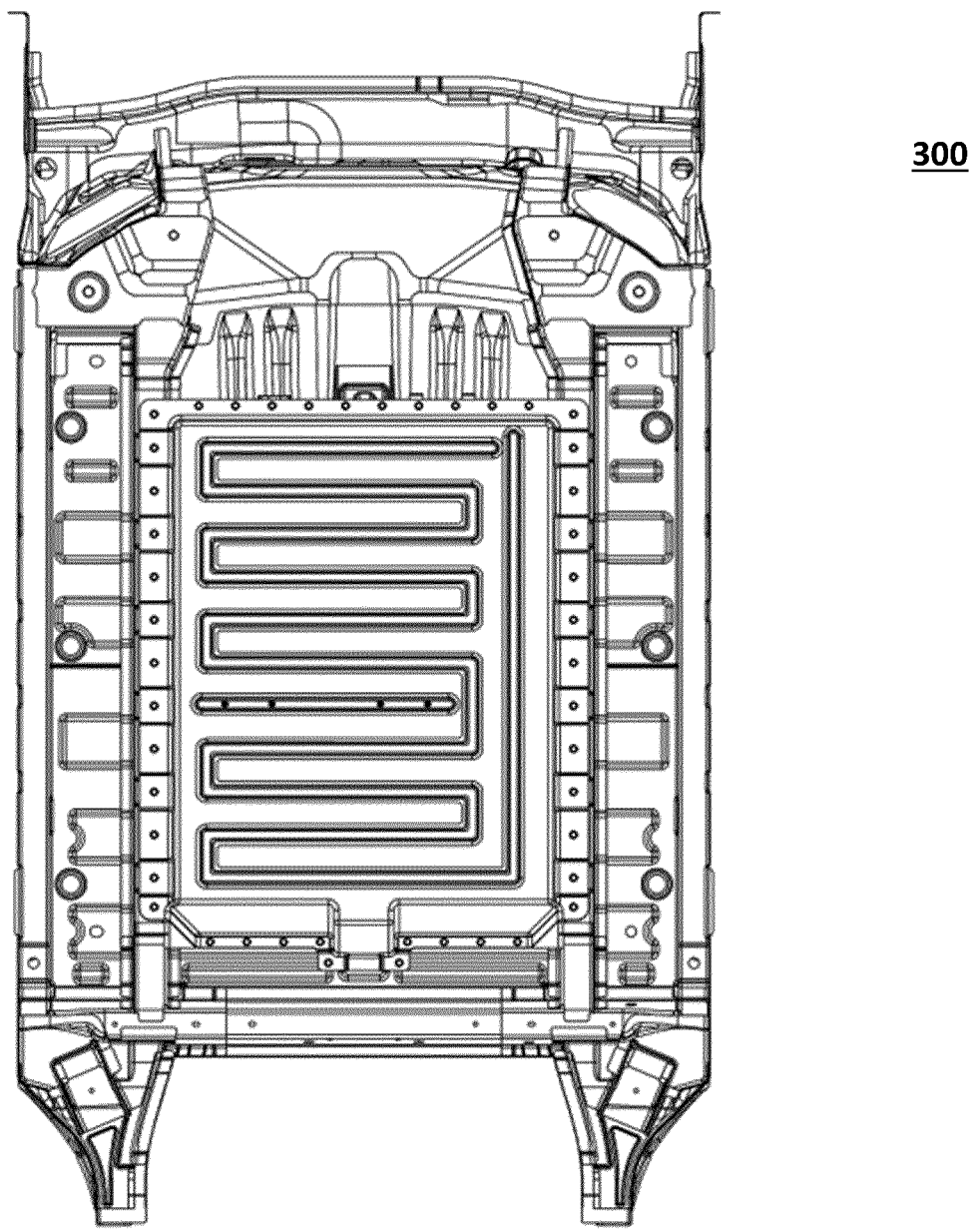
300

BATTERY COOLING ARRANGEMENT IN AN UNDERBODY OF A VEHICLE

TECHNICAL FIELD

This application claims the benefit of priority based on Korean Patent Application No. 10-2019-0096006, filed on Aug. 7, 2019, and the entire contents of the Korean patent application are incorporated herein by reference.

The present invention relates to an underbody for a vehicle, and more particularly, to an underbody that is directly fastened to a lower portion of a vehicle body frame and capable of storing a battery module therein.

BACKGROUND ART

As the price of energy sources increases due to the depletion of fossil fuels, and interest in environmental pollution is amplified, the demand for eco-friendly alternative energy sources is increasing. In particular, conventional automobiles using fossil fuels emit pollutants, which act as a major cause of environmental pollution.

In recent years, eco-friendly vehicles that can reduce environmental pollution are attracting attention as a means of replacing conventional fossil fuel-only vehicles. Eco-friendly vehicles include cases where driving power is obtained from secondary batteries, such as hybrid or electric vehicles.

A hybrid or electric vehicle has a structure in which a battery pack or battery module including a plurality of secondary batteries is mounted on a vehicle body. In order to increase the driving distance or power of a vehicle, a relatively large-capacity battery pack is required. However, in order to mount a large-capacity battery module on a vehicle body, there is a problem that a sufficient mounting space is required.

Korean Patent Publication No. 10-2019-0029954 discloses an underbody for an electric vehicle in which a battery pack can be mounted. In the above document, a center floor panel is assembled between both side sills consisting of a side sill inner panel and a side sill outer panel of a vehicle, and a battery pack storage space is secured under the center floor panel by a mounting member mounted inside the side seal. However, even according to the above document, it is not easy to replace all or part of the secondary battery as necessary after delivering a vehicle.

In addition, Korean Patent Registration No. 10-1565980 discloses a floor panel assembly for an electric vehicle. However, the above document discloses a content of cooling the battery module by an air-cooling method, and this cooling method has a limitation in that the temperature of the battery module cannot be effectively lowered when driving a vehicle. In addition, in the case of employing an air-cooled cooling method as in the above document, a separate space for forming an air flow path is required.

DISCLOSURE

Technical Problem

The present invention has been invented to solve the above problems, and an object of the present invention is to provide an underbody for a vehicle capable of directly fastening a battery module to a vehicle body frame.

Technical Solution

An underbody for a vehicle according to the present invention includes: a tray member which is fastened to a lower portion of a vehicle body frame and includes a receiving portion having a structure with an open lower surface while accommodating a battery module; and a cover member which covers an open lower surface of the receiving portion. Herein, the cover member includes a flow path through which a refrigerant fluid-moves.

According to an embodiment of the present invention, the cover member has a structure in which irregularities are formed on one or both surfaces of a plate-shaped panel, and the irregularities of the cover member are formed with protrusions or recessed portions along the flow path on the surface of the plate-shaped panel.

According to an embodiment of the present invention, the protrusions or recessed portions are arranged at regular intervals and include a curved area on the same plane.

According to an embodiment of the present invention, the protrusions or recessed portions are arranged at regular intervals and include patterned areas oriented in one direction.

According to an embodiment of the present invention, the cover member of the present invention includes a cooling layer in which a flow path through which a refrigerant fluid moves is formed; and a cover layer protecting a lower surface of the cooling layer.

Further, according to an embodiment of the present invention, in the cover member, the cooling layer and the cover layer have irregularities formed thereon, the irregularities of the cooling layer have a form in which protrusions are formed along a flow path on a surface of a plate-shaped panel, the irregularities of the cover layer have a form in which recessed portions are formed on the surface of the plate-shaped panel to correspond to the protrusions of the cooling layer, and the cooling layer and the cover layer have a structure in which the protrusions of the cooling layer are inserted into the recessed portions of the cover layer to be in close contact.

According to an embodiment of the present invention, the cooling layer is formed of a metal material, and the cover layer is formed of a plastic material.

According to an embodiment of the present invention, the underbody further includes an anti-vibration layer interposed between the cooling layer and the cover layer. The anti-vibration layer may be formed of a fibrous layer such as a nonwoven fabric or a foam layer of a resin.

According to an embodiment of the present invention, the cover member has a single-layer plate-shaped panel structure, and the flow path may be formed on one surface of the plate-shaped panel or recessed inside the plate-shaped panel.

According to an embodiment of the present invention, the cover member includes an area for opening and closing a part or whole of the open surface of the receiving portion.

According to an embodiment of the present invention, the receiving portion has an outer wall member surrounding the side surface of the battery module to be accommodated; and a partition wall member that divides the interior of the receiving portion into a plurality of compartments.

According to an embodiment of the present invention, the receiving portion includes: an outer wall member which surrounds a side surface of a battery module to be accommodated; and a partition wall member which divides an interior of the receiving portion into a plurality of compartments. Herein, each compartment has a structure in which individual battery modules are received.

According to an embodiment of the present invention, the outer wall member has a rectangular structure in which four surfaces are covered based on a planar cross-sectional structure. Further, the outer wall member includes: first and second front and rear direction outer wall members arranged to be perpendicular to the front and rear direction of the vehicle; and first and second left and right direction outer wall members arranged to be perpendicular to the left and right direction of the vehicle. Further, according to an embodiment of the present invention, at least one of the first and second left and right direction outer wall members have a structure capable of changing their position in the front and rear direction of the vehicle.

According to an embodiment of the present invention, the outer wall member has a structure in which three surfaces are covered based on a planar cross-sectional structure. Further, the outer wall member includes: first and second front and rear direction outer wall members arranged to be perpendicular to the front and rear direction of the vehicle; and a first left and right direction outer wall member arranged to be perpendicular to the left and right direction of the vehicle. Further, according to an embodiment of the present invention, the first left and right direction outer wall members has a structure capable of changing their position in the front and rear direction of the vehicle.

According to an embodiment of the present invention, the cover member is in a form of a bent panel and covers a lower side and an open surface of the receiving portion.

Further, the present invention provides a battery pack, and in the battery pack, a battery module may be accommodated in the underbody for a vehicle.

Further, the present invention provides a vehicle including the battery pack, and the vehicle may be a hybrid vehicle or an electric vehicle.

Advantageous Effects

The underbody for a vehicle according to the present invention can sufficiently secure a space for accommodating a battery module, can omit the process of separately assembling a battery tray after manufacturing the vehicle, and can effectively cool the housed battery module.

BRIEF DESCRIPTION OF THE DRAWINGS

FIG. 1 is an exploded perspective view showing a coupling structure of an underbody for a vehicle according to an embodiment of the present invention.

FIGS. 2 and 3 are schematic views of a cover member of an underbody for a vehicle according to an embodiment of the present invention, observed from below and above, respectively.

FIG. 4 is a schematic view of a cover member of an underbody for a vehicle according to another embodiment of the present invention.

FIGS. 5 and 6 are cross-sectional views showing cross sections of cover members of an underbody for a vehicle according to embodiments of the present invention, respectively.

FIG. 7 is a schematic diagram showing the main configuration of a battery module according to an embodiment of the present invention.

FIG. 8 is a perspective view showing a tray member of an underbody for a vehicle according to an embodiment of the present invention.

FIG. 9 is a schematic diagram showing a state in which a battery module is mounted on a tray member of an underbody for a vehicle according to an embodiment of the present invention.

FIG. 10 is a view showing an underbody for a vehicle according to an embodiment of the present invention.

DETAILED DESCRIPTION OF THE PREFERRED EMBODIMENTS

Hereinafter, specific embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In addition, in the present invention, the longitudinal direction of the vehicle body is defined as the "front and rear direction", the width direction of the vehicle body is defined as the "left and right direction", and the height of the vehicle body is defined as the "up and down direction". The longitudinal direction, width direction, and height direction are defined based on the shape of a general vehicle.

Hereinafter, the present invention will be described in detail with reference to the drawings.

The present invention relates to an underbody for a vehicle, including: a tray member that is fastened to a lower portion of a vehicle body frame and includes a receiving portion having a structure in which the lower surface is open while accommodating the battery; and a cover member that covers the open lower surface of the receiving unit, in which the cover member includes a flow path through which the refrigerant fluidly moves.

The underbody has a structure that is directly fastened to the lower portion of the vehicle body frame. In the present invention, "direct fastening" means fastening without using a separate intermediate material or parts for fastening. For example, the underbody may be directly fastened to the lower portion of the vehicle body frame through welding or bolting. Conventionally, a battery pack in which a battery module is accommodated in a tray member is assembled from the outside, and the assembled battery pack is coupled to a lower portion of a vehicle body through an additional assembly process. Specifically, in the related art, the battery pack and the vehicle are manufactured separately, and the battery pack assembled on one surface of the underbody of the vehicle is mounted in a separate process.

When the separately manufactured battery pack is mounted on a vehicle, a separate fixing member for mounting the battery pack on the vehicle body is used. In this case, a space for mounting the fixing member is required, and the number of parts and assembly process increase. In addition, since a separate pack cover and tray for accommodating the battery module are required, space efficiency decreases and weight increases. In particular, there is a problem that the rigidity between the vehicle body frame and the lower tray is overlapped, which is inefficient in robust design.

The present invention provides an underbody including a battery module receiving portion. The underbody is an element of a vehicle body constituting a vehicle. Specifically, the underbody constitutes the bottom surface of the vehicle body and at the same time constitutes one surface of the battery module receiving portion. Through this, the present invention reduces the number of parts and assembly process, increases space efficiency, and prevents overlapping robustness.

The underbody for an automobile according to the present invention includes a tray member and a cover member.

In one example, the cover member has a structure in which irregularities are formed on one or both surfaces of the plate-shaped panel. The irregularities of the cover member are formed on the surface of the plate-shaped panel, and has a structure in which protrusions or recessed portions are formed along the flow path. The cover member has an effect of increasing rigidity by forming an uneven structure. In addition, by integrating the irregularities of the cover member and the shape of the flow path for cooling the battery module, the volume required for forming the cover member can be minimized.

In one example, the protrusions or recessed portions are arranged at regular intervals and include a curved area on the same plane. The protrusion or the recessed portion may increase resistance to an impact applied in unspecified or various directions by including a curved area.

In another example, the protrusions or recessed portions are arranged at regular intervals and include patterned areas oriented in one direction. The protrusion includes a pattern oriented in one direction, thereby increasing the rigidity of the vehicle body. For example, the protrusion or recessed portion includes a patterned area oriented in the front and rear direction or in the width direction, and in this case, resistance to a force applied perpendicular to the pattern direction of the protrusion or recessed portion may be increased.

For example, the irregularities of the cover member according to the present invention include a pattern in which the uneven structure oriented in one direction is repeated, and the end of the irregularities oriented in each one direction may have a shape connected through a curved uneven structure.

In this regard, FIG. 1 is an exploded perspective view of an underbody according to an embodiment of the present invention, and shows a coupling structure of the underbody.

Referring to FIG. 1, the underbody for a vehicle according to the present invention includes a tray member 300 that is fastened to the lower portion of the vehicle body frame and accommodates a battery module, a battery module 210 accommodated in the receiving portion of the tray member 300, and a cover member 100 that covers the receiving portion of the tray member 300. The tray member 300 is located at the uppermost portion of an underbody for a vehicle based on the vehicle body, and the cover member 100 is located at the lowermost portion thereof.

One or more electrical devices 230 are mounted on one surface of the battery module 210 as necessary. The electrical device 230 includes: a battery management system (BMS) installed adjacent to the battery module 210 and monitoring and controlling the operation of the battery module 210; a battery disconnect unit (BDU) that is mounted adjacent to the battery module 210 and the BMS and controls the electrical connection of the battery module 210; a fuse located between the battery module 210 and the BMS and providing an overcurrent blocking function; a bus bar connected to the module terminal of the battery module 210 to electrically connect the battery module 210; and LV wires electrically connecting the electrical device.

The BMS may further include components such as a current sensor or a relay. The current sensor is a component that senses the charging/discharging current of the battery pack, and the relay is a switching component that selectively opens and closes the charging/discharging path through which the charging/discharging current of the battery pack flows, and can be controlled while exchanging information with the BMS.

In addition, a thermal interface material (TIM) 231 may be interposed between the battery module 210 and the cover member 100. The TIM 231 includes a material having excellent thermal conductivity, and a thermal pad or resin may be used. The TIM 231 fills an empty space due to the surface roughness of the contact surface between the battery module 210 and the cover member 100 to reduce thermal contact resistance therebetween. Heat generated from the battery module 210 can be quickly discharged toward the cover member 100 below.

The TIM 231 is in direct contact with one surface of the battery module 210 and the cover member 100 and may have a size corresponding to the area of the battery module 210 accommodated in the tray member 300. The TIM 231 may have a structure separated to correspond to each battery module, but is not limited thereto.

In addition, the battery module 210 may be fastened to the tray member 300 by a predetermined method, and mechanically fastened using, for example, a mounting bolt 220 and a mounting nut (not shown). It may be collectively referred to as the battery pack 200 including the battery module 210 and the electrical device 230, and may further include a mounting bolt 220 for fixing the battery module 210.

As described above, the underbody for a vehicle according to the present invention may include a battery module 210 and an electrical device 230 mounted on one surface of the battery module 210. In addition, the tray member 300 simultaneously serves as a lower tray of a conventional battery module and an undercover of a vehicle.

In the present invention, the cover member includes a flow path through which the refrigerant moves.

The battery module generates a lot of heat during operation, and cooling is essential for maintaining battery performance and safety. Cooling of the battery module may be performed by forming an air flow path on one surface of the battery module or attaching a cooling plate for heat radiation. However, when cooling of the battery module is performed by forming an air flow path, there is a problem in that the cooling efficiency is lower than when cooling is performed using a cooling plate, and in particular, a separate space should be secured to form the flow path. When cooling of the battery module is performed by attaching a cooling plate to one surface of the battery module, a space for forming a separate cooling plate is required. In addition, the cooling plate should be located below the battery module. This is because, when the cooling plate is located above the battery module, if the cooling plate is damaged, the refrigerant may leak from the cooling plate and cause a short circuit while contacting the terminal of the battery.

Accordingly, in the present invention, by integrating the flow path, through which the refrigerant flows, with the cover member, space waste due to the installation of the cooling plate is minimized, and cooling can be performed at the lowermost portion of the vehicle body. In addition, by forming a cover member including a flow path, the cover member is disposed under the battery module, through which the contact force with the battery module is strengthened by the load of the battery module, thereby improving cooling efficiency.

In one embodiment, the cover member of the present invention includes a cooling layer in which a flow path through which a refrigerant fluid moves is formed; and a cover layer protecting a lower surface of the cooling layer. In this case, in the cover member, the cooling layer and the cover layer are formed with irregularities, the irregularities of the cooling layer have a shape in which protrusions are formed along a flow path on the surface of the plate-shaped panel, and the irregularities of the cover layer have a shape in which recessed portions are formed on the surface of the plate-shaped panel to correspond to the protrusions of the cooling layer. In addition, the cooling layer and the cover layer may have a structure in which a protrusion of the cooling layer is inserted into a recessed portion of the cover layer to be in close contact. As described above, the cover member has a structure to supplement rigidity by forming irregularities. In the present invention, cooling and space efficiency can be simultaneously improved by integrating the irregularities of the cover member and the arrangement of the flow path.

When the cover member has a structure in which a cooling layer and a cover layer are laminated, each of the layers may be formed of a different material. Specifically, the cooling layer is formed of a metal material, and the cover layer is formed of a plastic material. The metal material forming the cooling layer is not particularly limited as long as it is a metal material having thermal conductivity, but may be, for example, at least one selected from copper, aluminum, iron, and alloys thereof. The material of the cover layer is not particularly limited as long as it is a plastic material having a certain level of rigidity, but for example, a plastic material including at least one of PP, PE, and PET may be used, and if necessary, dispersed fibers, etc. may be included in the layer.

The present invention may further include an anti-vibration layer positioned between the cooling layer and the cover layer. The anti-vibration layer serves to block vibration and noise coming up from the lower portion of the vehicle body when driving the vehicle. The anti-vibration layer may be formed of, for example, one or more of a nonwoven fabric layer, a resin fiber layer, a resin layer, and a foam layer.

In another embodiment, the cover member has a single-layer plate-shaped panel structure, and the flow path may be formed on one surface of the plate-shaped panel or recessed inside the plate-shaped panel. The flow path is formed on one surface of the plate-shaped panel when the flow path is attached to one surface of the plate-shaped panel. In this case, the flow path has a shape attached to the surface of the cover member or partially recessed inside the cover member based on the cross section of the flow path, and protrusions are formed in the cover member along the flow path. The form in which the flow path is recessed inside the plate-shaped panel is a case where the flow path is recessed in the cover member. In this case, the flow path is partially or entirely embedded in the cover member based on the cross section of the flow path, and protrusions are formed on one or both surfaces of the cover member along the flow path.

When the cover member of the present invention has a single-layer plate-shaped panel structure, the cover member may be formed of a metal material. The metal material is not particularly limited as long as it is a metal material having excellent thermal conductivity, but may be, for example, at least one selected from copper, aluminum, iron, and alloys thereof.

In addition, the cover member may include an area for opening and closing part or whole of the open surface of the receiving portion formed on the tray member. The cover member serves to cover the open surface of the receiving portion, and has a structure that can be opened when necessary. In the process of using the battery module, there are cases in which repair or replacement is required. At this time, by removing only the cover member, it is possible to repair or replace the battery module. The cover member is detachably attached to the tray member, and has, for example, a bolted structure.

FIGS. 2 and 3 are schematic views of a cover member of an underbody for a vehicle according to an embodiment of the present invention, observed from below and above, respectively.

FIG. 2 is a schematic view of the cover member observed from below. The cover member 100 has a plate-shaped panel structure and a structure in which a flow path is formed, and irregularities 111 are formed on the surface of the cover member 100. A central fixing point 112 for intermediate fastening is formed in a specific area among the irregularities 111 of the cover member 100, and a bolt through hole 113 for fastening is formed at the edge of the cover member 100.

Specifically, the cover member 100 has a plate-shaped structure having a size covering the open surface of the receiving portion, and bolt through holes 111 for coupling are formed to be spaced apart from each other at regular intervals on the outer periphery of the cover member 100. In addition, the outer periphery of the cover member 100 may have irregularities having a shape corresponding to the uneven shape of the end of the outer wall member. By forming irregularities on the outer periphery of the cover member 100 and the end of the outer wall member, as the outer periphery of the cover member 100 and the end of the outer wall member are accurately engaged by irregularities, the coupling force between the cover member 100 and the outer wall member can be strengthened, and the cover member 100 can be prevented from being separated by external vibration or shock.

In addition, irregularities 111 are formed on the outer surface of the cover member 100. The irregularities 111 are formed on the surface of the cover member 100 and are recessed along a flow path. The irregularities 111 have a shape protruding or recessed from the outer surface in a direction in contact with the battery module. Accordingly, the cover member 100 may more effectively and safely protect the battery module against physical shock or stress applied from the outside in various operating environments.

In addition, one side surface of the cover member 100 is vertically bent. The vertically bent cover member 100 may cover an open surface and/or a side surface. By using the L-shaped cover member 100 as described above, the number of outer wall members positioned in the front and rear directions of the tray member can be reduced. In addition, the cover member 100 simplifies the number of parts and an assembly process, and can form a structure resistant to external impact.

One side surface of the cover member 100 that is vertically bent is again vertically bent to form a coupling surface with the tray member 300, and a hole for fastening the bolt to the vehicle body frame is formed on the coupling surface. The central portion of the vertically bent side may have a structure protruding toward the outside in order to improve the bonding force and rigidity with the tray member 300, and the width of the protruding portion may be the same as the distance between the battery module assemblies spaced apart from each other.

In addition, the cover member 100 has a central fixing point 112 formed at a portion that contacts the partition wall member of the tray member in the central portion, so that additional coupling with the partition wall member is possible through bolts or the like.

FIG. 3 is a schematic view of the cover member observed from above. Referring to FIG. 3, an inlet port 121 and an outlet port 122 through which refrigerant flows into or out of a flow path are formed at one side of the cover member 100. A refrigerant flow path connected to the inlet port 121 and the outlet port 122 is formed so that the refrigerant introduced through the inlet port 121 cools the battery module by heat exchange. In addition, valves capable of adjusting the flow of refrigerant may be installed at the inlet port 121 and the outlet port 122. In addition, referring to FIG. 3, the inlet port 121 and the outlet port 122 are located at the end of the cover member in one direction. Accordingly, a through hole through which the inlet port 121 and the outlet port 122 can pass is formed on one side of the tray member, and the inlet port 121 and the outlet port 122 are connected to an external refrigerant storage space through the through hole.

In the present invention, as the refrigerant, a fluid that easily flows in a flow path and has excellent cooling properties may be used, and water, antifreeze, gas refrigerant or air may be used, but water capable of maximizing cooling efficiency due to high latent heat is most preferred.

The refrigerant flow path has a structure in which several straight and curved sections coexist by taking a serpentine hairpin loop structure to make the temperature distribution uniform.

FIG. 4 is a schematic view of a cover member of an underbody for a vehicle according to another embodiment of the present invention. FIG. 4 is a schematic view of the cover member observed from below. The cover member 100 has a plate-shaped panel structure and a structure in which a flow path is formed, and irregularities 111 are formed on the surface of the cover member 100. The irregularities 111 formed on the surface of the cover member 100 have a shape in which a straight pattern extending in the left and right direction is repeated, which is formed along a straight pattern in the area in which the flow path is formed. A central fixing point 112 for intermediate fastening is formed in a specific area among the irregularities 111 of the cover member 100, and a bolt through hole 113 for fastening is formed at the edge of the cover member 100.

FIGS. 5 and 6 are cross-sectional views showing a cross section of a cover member of an underbody for a vehicle according to an embodiment of the present invention, respectively.

As an example, referring to the cross section of the cover member disclosed in FIG. 5, the cover member 100 has a structure in which the cooling layer 103 and the cover layer 104 are formed with irregularities. The cooling layer 103 has a flow path 101 formed therein, and a protrusion is formed on the surface along the flow path 101. The cover layer 104 has a shape in which a recessed portion is formed to correspond to the protrusion of the cooling layer 103 on the surface of the plate-shaped panel, and has a structure that the protrusion of the cooling layer 103 is inserted into the recessed portion of the cover layer 104 to be in close contact. The cooling layer 103 may be formed of an aluminum alloy, and the cover layer 104 may be formed of a plastic material.

As another example, referring to the cross section of the cover member disclosed in FIG. 6, the cover member 100 has a single-layer plate-shaped panel structure, and a flow path 102 is formed in the panel structure. The flow path 102 is located in a form partially recessed inside the plate-shaped panel structure. The plate-shaped panel may be formed of an aluminum alloy or the like.

One area for forming the flow paths 101 and 102 of the cover member 100 may be provided per battery module, but in order to simplify the number of parts and the assembly process, it is preferable to be manufactured as an integral type covering all of the battery modules.

In the present invention, the receiving portion has an outer wall member surrounding the side surface of the battery module to be accommodated; and a partition wall member that divides the interior of the receiving portion into a plurality of compartments. Individual battery modules are accommodated in each fractional area divided by the partition member. The outer wall member divides an area in which the battery module is accommodated, and the partition wall member divides the interior of the receiving portion when two or more battery modules are accommodated. In addition, the outer wall member and the partition wall member serve to fix the accommodated battery module from the side surface.

In one example, the outer wall member has a rectangular structure in which four surfaces are covered based on a planar cross-sectional structure. In this case, the outer wall member includes first and second front and rear direction outer wall members arranged to be perpendicular to the front and rear direction of the vehicle; and first and second left and right direction outer wall members arranged to be perpendicular to the left and right directions of the vehicle. Further, at least one of the first and second left and right direction outer wall members may have a structure capable of changing their position in the front and rear direction of the vehicle. By forming at least one of the first and second left and right direction outer wall members in a structure capable of changing their position in the front and rear direction of the vehicle, the area of the receiving portion can be flexibly adjusted according to the size or number of insertions of battery modules.

In yet another example, the outer wall member forms a structure in which three surfaces are enclosed based on a planar cross-sectional structure. Specifically, the outer wall member forms a "c" structure in which three surfaces are continuously wrapped and the other surface is open. In this case, the outer wall member includes first and second front and rear direction outer wall members arranged to be perpendicular to the front and rear direction of the vehicle; and a first left and right direction outer wall member arranged to be perpendicular to the left and right directions of the vehicle. Further, the first left and right direction outer wall member may have a structure capable of changing its position in the front and rear direction of the vehicle. By forming the first left and right direction outer wall member in a structure capable of changing their position in the front and rear direction of the vehicle, the area of the receiving portion can be flexibly adjusted according to the size or number of insertions of battery modules.

In one example, when the outer wall member has a structure in which three surfaces are enclosed based on a planar cross-sectional structure, the cover member has a bent panel shape. Through this, the cover member forms a structure covering the lower surface of the receiving portion and the open side surface.

FIG. 7 is a schematic diagram showing the main configuration of a battery module according to an embodiment of the present invention.

Referring to FIG. 7, the battery module 210 includes a case in which a plurality of divided battery modules are assembled, and each battery module may include a secondary battery (not shown). In particular, the secondary battery may be a pouch-type secondary battery, and the pouch-type secondary battery may include an electrode assembly, an electrolyte solution, and a pouch case.

Here, the electrode assembly is an assembly of an electrode and a separator, and may be configured in a form in which one or more positive electrode plates and one or more negative electrode plates are disposed with the separator interposed therebetween. In addition, each electrode plate of the electrode assembly is provided with an electrode tab, and one or more electrode tabs may be connected to the electrode lead. In addition, the electrode lead is interposed between the pouch case and one end is exposed to the outside, and the exposed portion may function as an electrode terminal of the secondary battery. The pouch case may contain an electrolyte solution together with the electrode assembly in the inner space. In addition, the pouch case may be configured in a form in which the edge portion is sealed by a method such as heat fusion. The pouch case may be composed of an upper pouch and a lower pouch, and each pouch includes an outer insulating layer, a metal layer, and an inner adhesive layer, so that the inner adhesive layers may be fused to each other.

The configuration of such a secondary battery is obvious to a person skilled in the art to which the present invention pertains, and thus a more detailed description thereof will be omitted. In addition, various secondary batteries known at the time of filing the present invention may be employed in the battery module according to the present invention.

The battery module 210 may include a plurality of secondary batteries. In particular, a plurality of secondary batteries, as pouch-type secondary batteries, may be stacked vertically or horizontally in a form in which wide surfaces face each other to thereby form a secondary battery laminate. In order to facilitate stacking, such a secondary battery may include a cartridge in the shape of a square ring surrounding the rim of the secondary battery, or may be mounted in a state in which the secondary battery is stacked in the module case 211. In this case, it is more preferable to use a module case in terms of securing space for the secondary battery.

The module case 211 may be formed of a metal material having high mechanical strength and excellent thermal conductivity, and there is no particular limitation on the shape of the module case 211, but it can be formed as a mono frame in the form of a square column tube, and after bonding the U-shaped frame to both sides of the secondary battery laminate, the U-shaped frames may be connected with a separate plate-shaped frame. A groove for mounting a secondary battery may be formed inside the module case 211. Such a module case can prevent its flow by holding the secondary battery.

The battery module is completed by mounting the cover on the open front and rear portions of the module case 211. A duct through which air flows between the inside and outside of the battery module, and a sensing assembly connected to an electrode lead of the secondary battery to sense a voltage of the secondary battery, and the like may be further provided. The sensing assembly may include a plurality of bus bars, connectors, harness wires, printed circuit boards, etc. that are individually connected to the pouch-type secondary battery, respectively.

In the present invention, one or more battery modules 210 are mounted on a tray member 300 to be described later. The battery module 210 includes a case where a plurality of battery modules 210 form one pack. That is, a plurality of battery modules 210 may be connected in series and/or in parallel according to the output and capacity required for the battery pack.

FIG. 8 is a perspective view showing the structure of the tray member 300 according to an embodiment of the present invention, and FIG. 9 is a perspective view showing a state in which the battery module 210 is coupled on the tray member 300 according to an embodiment of the present invention.

Referring to FIGS. 8 and 9, the tray member 300 includes outer wall members 320 and 340 surrounding a side surface of a receiving portion 310, which is a battery module accommodation space; and a partition wall member 330 extending in the front and rear and left and right directions so as to divide the receiving portion 310 into a plurality of partitions. In addition, the outer wall member 340 positioned perpendicular to the front and rear direction is formed in the form of a side cover, and can be moved in the front and rear direction if necessary. In addition, the outer wall members 320 and 340 form three or four walls from the bottom of the tray member 300 and form an insertion portion 310 into which the battery module 210 is inserted.

The tray member 300 has a bottom surface of a certain area, and the battery module is mounted on the bottom surface of the tray member 300. The bottom surface is formed with a plurality of uneven portions or ribs 311 so that the battery module does not move due to external shock or vibration and a stable mounting state is maintained.

The outer wall members 320 and 340 protrude from the bottom surface of the tray member 300 to a predetermined height and protrude to a length corresponding to the height of the battery module 210. As a result, the outer wall members 320 and 340 have a shape surrounding the battery module 210 by extending along the front and rear or left and right sides of the battery module 210. The outer wall member 320 formed to extend along the left and right sides of the battery module 210 has a bolt insertion groove 321 for fastening to the frame of the vehicle body.

Irregularities are formed at the end of the outer wall member 320 to enhance a coupling force with the vehicle body frame. In more detail, a portion in which the bolt insertion groove 321 is formed protrudes, and a portion in which the bolt insertion groove 321 is not formed may have a recessed structure.

The partition wall member 330 is installed on the tray member 300 to which the battery module 210 is fastened, and the insertion portion 310 is divided to fasten the plurality of battery modules 210 in units of a predetermined number of battery modules. The partition wall member 330 has a shape extending in the front and rear and left and right directions of the tray member 300.

A plurality of battery modules 210 according to the present invention can be applied. Referring to FIGS. 8 and 9, as there are a first partition wall member 331 extending in the front and rear direction and a second partition wall member 332 extending in the left and right direction, the battery modules 210 are divided into a battery module assembly composed of two battery modules, and each of the four battery module assemblies is mounted. However, there are no particular restrictions on the number of partition wall members, the number of battery module assemblies, the number of battery modules included in the battery module assembly, and the arrangement of the battery modules. For example, two or more first partition wall members extending in the front and rear direction may be installed, two or more second partition wall members extending in the left and right direction may be installed, and the battery modules may be arranged in parallel in the left and right direction, or parallel in the front and rear direction.

In addition, referring to FIG. 9, since a predetermined space is formed between the side surfaces of the battery module 210, some of electrical devices such as BMS and BDU may be disposed in the space, thereby improving the efficiency of space utilization. Wires and connectors extending from the BMS and BDU are fixed to the lower portion of the battery module based on the vehicle body. In addition, an electrical device such as a bus bar or a connector may be mounted on an upper end of the partition wall member 330 in a space between the battery modules.

Meanwhile, in the tray member 300, the outer wall member 340 positioned in the front and rear direction is formed on one side of the battery module 210 to fix and protect the battery module 210. The outer wall member 340 located in the front and rear direction has a structure that can be detached from the tray member 300, the mounting surface 341 for coupling with the cover member is bent to be formed in the outer wall member 340 located in the front and rear direction, and a bolt through hole is formed in the mounting surface 341 to enable bolt coupling.

In addition, a support portion 343 for supporting the outer wall member 340 protrudes in the center of the outer wall member 340 positioned in the front-rear direction. The support portion 343 includes a support 344 extending in a diagonal direction toward the tray member 300 from the center of the outer wall member 340 positioned in the front and rear direction, and a support plate 345 connected to the support 344 and in contact with the tray member 300.

In a more specific example, the support 344 and the support plate 345 form a flange structure. Since the outer wall member 340 positioned in the front and rear direction is coupled to the tray member 300 and the cover member through a narrow mounting surface 341, the part bent by external impact may be easily bent in the front and rear direction and damaged, and thus it may be stably fixed to the vehicle body frame through the support portion 343.

In more detail, a portion where the tray member 300 and the support portion contact may have a structure that is recessed according to the shape of the support portion 343. Referring to FIGS. 8 and 9, the support plate 345 constituting the support portion 343 may have a plate-shaped structure, and a portion in which the tray member 300 contacts the support plate 345 is recessed compared to the side portion of the support plate 345 in the left and right direction. That is, the support plate 345 has a shape that the support portion 343 is fixed between the recessed portions of the tray member 300, and through this, it is possible to prevent the horizontal direction flow of the outer wall member 340 positioned in the front and rear direction.

In addition, a mounting bracket (not shown) for fixing the battery module to the insertion portion 310 may be installed on the tray member 300.

As described above, the undercover for a vehicle according to the present invention exhibits superior performance compared to separately manufacturing and then combining the battery pack by directly fastening the battery module to the body frame.

As described above, the undercover for a vehicle according to the present invention exhibits superior performance compared to separately manufacturing and then combining the battery pack by directly fastening the battery module to the vehicle body frame.

In conclusion, referring to FIG. 10, in the undercover according to the present invention, the battery module 210 is directly fastened to the insertion portion 310 formed in the tray member 300 on which the outer wall members 320 and 340 surrounding the side of the battery module 210 and the partition member 330 are mounted, the electrical device is mounted on the battery module, and then the cover member 100 in which the cooling flow path is integrated is positioned. Accordingly, the floor area ratio of the battery module can be increased, the efficiency and safety of the battery module mounting process can be improved, and it is easy to repair or replace the battery module by opening and closing the cover member as needed.

In addition, the present invention provides a battery pack including the underbody, and a battery module is accommodated in the underbody for a vehicle. More specifically, the battery pack includes an underbody for a vehicle including: a tray member including a receiving portion having an open lower surface under a vehicle body frame; and a cover member covering the opened lower surface of the receiving portion, and a battery module accommodated in the receiving portion. The flow path through which the refrigerant fluidly moves is formed in the cover member. That is, in the present invention, since the battery module is directly fastened to the vehicle body frame, the vehicle body frame and the battery module accommodated therein form one battery pack.

In addition, the present invention provides a vehicle including the battery pack, and the vehicle includes an underbody under a vehicle body and a battery module accommodated in a receiving portion. The vehicle may be a hybrid vehicle or an electric vehicle.

In the above, preferred embodiments of the present invention have been illustrated and described, but the present invention is not limited to the specific preferred embodiments described above, and without departing from the gist of the present invention claimed in the claims, any person with ordinary knowledge in the technical field to which the present invention pertains can implement various modifications, and such changes will fall within the scope of the description of the claims.

On the other hand, although terms indicating directions such as up, down, front, rear, left and right have been used in the present specification, it is obvious to those skilled in the art that these terms are for convenience of description and may be expressed differently depending on the viewing position of the observer or the position of the object.

DESCRIPTION OF REFERENCE NUMERALS

100: cover member
101, 102: flow path
103: cooling layer
104: cover layer
111: irregularities
112: central fixed point
113: bolt through hole
121: inlet port
122: outlet port
200: battery pack
210: battery module
211: module case
220: mounting bolt
230: electrical device
231: TIM
300: tray member
310: receiving portion
311: rib
320, 340: outer wall member
321: bolt insertion groove
330: partition wall member
331: first partition wall member 332: second partition wall member
341: mounting surface
343: support portion
344: support
345: support plate

The invention claimed is:

1. An underbody for a vehicle, comprising:
a tray member fastened to a lower portion of a vehicle body frame and including a receiving portion having a structure with an open lower surface to accommodate a battery module; and
a cover member to cover the open lower surface of the receiving portion,
wherein the cover member includes a flow path to circulate a refrigerant fluid,
wherein the cover member is provided as a plate-shaped panel in which irregularities are formed on one or both surfaces thereof, and
wherein the irregularities of the cover member includes protrusions and recessed portions along the flow path on the one or both surfaces of the plate-shaped panel,
wherein the flow path is located between a first protrusion of the protrusions that protrudes from the plate-shaped panel and towards the tray member and a second protrusion of the protrusions that protrudes from the plate-shaped panel and away from the tray member, and
wherein the first protrusion and the second protrusion are aligned and coupled to form the flow path.

2. The underbody of claim 1, wherein the protrusions and recessed portions are arranged at regular intervals and include a curved area on a same plane.

3. The underbody of claim 1, wherein the protrusions and recessed portions are arranged at regular intervals and include a patterned area oriented in one direction.

4. The underbody of claim 1, wherein the cover member includes:
a cooling layer on which the flow path is formed; and
a cover layer which protects a lower surface of the cooling layer.

5. The underbody of claim 4, wherein in the cover member, the cooling layer and the cover layer have the irregularities formed thereon,
wherein the irregularities of the cooling layer have protrusions that are formed along the flow path on a surface of the plate-shaped panel,
wherein the irregularities of the cover layer have recessed portions that are formed on the surface of the plate-shaped panel to correspond to the protrusions of the cooling layer, and
wherein the cooling layer and the cover layer have a structure in which the protrusions of the cooling layer are inserted into the recessed portions of the cover layer to be in close contact.

6. The underbody of claim 4, wherein the cooling layer is formed of a metal material, and the cover layer is formed of a plastic material.

7. The underbody of claim 4, further comprising an anti-vibration layer interposed between the cooling layer and the cover layer.

8. The underbody of claim 1, wherein the cover member is provided as a plate-shaped panel of a single layer, and
wherein the flow path is formed on one side of the plate-shaped panel or is recessed into the plate-shaped panel.

9. The underbody of claim 1, wherein the cover member includes an area configured to open or close a part or whole of the open lower surface of the receiving portion.

10. The underbody of claim 1, wherein the receiving portion includes:
an outer wall member which surrounds a side surface of a battery module of a plurality of battery modules to be accommodated therein; and
a partition wall member which divides an interior of the receiving portion into a plurality of compartments, and
wherein each compartment of the plurality of compartments has a structure in which individual battery modules are received.

11. The underbody of claim 10, wherein the outer wall member has a rectangular structure in which four surfaces are covered based on a planar cross-sectional structure,
wherein the outer wall member includes:
first and second front and rear direction outer wall members arranged to be perpendicular to a front and rear direction of the vehicle; and
first and second left and right direction outer wall members arranged to be perpendicular to a left and right direction of the vehicle, and
wherein at least one of the first and second left and right direction outer wall members have a structure capable of changing their position in the front and rear direction of the vehicle.

12. The underbody of claim 10, wherein the outer wall member has a structure in which three surfaces are covered based on a planar cross-sectional structure,
wherein the outer wall member includes:
first and second front and rear direction outer wall members arranged to be perpendicular to a front and rear direction of the vehicle; and
a first left and right direction outer wall member arranged to be perpendicular to a left and right direction of the vehicle, and
wherein the first left and right direction outer wall members has a structure capable of changing their position in the front and rear direction of the vehicle.

13. The underbody of claim 12, wherein the cover member is in a form of a bent panel and covers a lower side and the open lower surface of the receiving portion.

14. A battery pack, in which a battery module is accommodated in the underbody for a vehicle according to claim 1.

15. A vehicle comprising the battery pack according to claim 14.

16. The vehicle of claim 15, wherein the vehicle is a hybrid vehicle or an electric vehicle.

17. The underbody of claim 1, wherein the flow path is arranged in a zig-zag pattern.

18. The underbody of claim 1, wherein the first protrusion and the second protrusion contact at the recessed portions at opposite ends of each of the first protrusion and the second protrusion.

19. An underbody for a vehicle, comprising:
a tray member fastened to a lower portion of a vehicle body frame and including a receiving portion having a structure with an open lower surface to accommodate a battery module; and
a cover member to cover the open lower surface of the receiving portion,
wherein the cover member includes:
a flow path to circulate a refrigerant fluid;
a cooling layer on which the flow path is formed; and a cover layer which protects a lower surface of the cooling layer, and wherein the cover member is provided as a plate-shaped panel, and in the cover member, the cooling layer and the cover layer have irregularities formed thereon, wherein the irregularities of the cooling layer have protrusions that are formed along the flow path on a surface of the plate-shaped panel, wherein the irregularities of the cover layer have recessed portions that are formed on the surface of the plate-shaped panel to correspond to the protrusions of the cooling layer, and wherein the cooling layer and the cover layer have a structure in which the protrusions of the cooling layer are inserted into the recessed portions of the cover layer to be in close contact.

\* \* \* \* \*